March 31, 1925.

A. H. MIDGLEY 1,531,447

MANUFACTURE OF LAMINATED METAL OR OTHER MASSES

Filed April 3, 1922

Inventor
A. H. Midgley,
By Marks&Clerk
Attys.

Patented Mar. 31, 1925.

1,531,447

UNITED STATES PATENT OFFICE.

ALBERT HENRY MIDGLEY, OF UXBRIDGE, ENGLAND, ASSIGNOR TO MIDGLEY CAR LIGHTING COMPANY, LIMITED, OF LONDON, ENGLAND.

MANUFACTURE OF LAMINATED METAL OR OTHER MASSES.

Application filed April 3, 1922. Serial No. 549,329.

*To all whom it may concern:*

Be it known that I, ALBERT HENRY MIDGLEY, a subject of the King of Great Britain and Ireland, and residing at Fairfield, Harefield Road, Uxbridge, in the county of Middlesex, England, have invented certain new and useful Improvements in the Manufacture of Laminated Metal or Other Masses, of which the following is a specification.

This invention relates to the manufacture of laminated metal or other masses and while it is applicable in general to bodies or masses of this character it is more particularly designed for the production of the laminated pole pieces of electro-magnets or as used in connection with dynamo electric machines.

The object of the invention is to provide laminated masses of which the laminations or stampings are so secured together that they cannot easily be distorted and will be capable of being drilled or tapped for the use of fixing screws or otherwise worked or machined to suit the particular function which they are to fulfill.

The invention consists in a laminated metal or other mass of which the laminations are held together by clamping means forming part of the laminated mass.

More specifically the invention consists in a laminated mass of which the laminations are held together by one or more U-shaped or other pieces of metal or other suitable material on to which the laminations are threaded and the ends of which are bent over or riveted or otherwise formed or treated to prevent the stampings or laminations from coming apart.

The accompanying drawings illustrate one mode of carrying out the invention:

Figure 1:
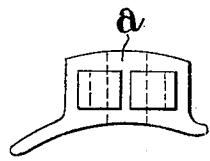
Figure 1 is a side elevation of one form of pole piece in accordance with the invention.
Figure 2:
Figure 2 is a front elevation.
Figure 3:
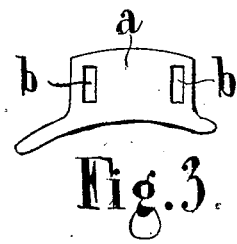
Figure 3 is a side elevation of one lamination.
Figure 4:
Figures 4 and 5 are respectively a plan and elevation of a clamping member.
Figure 5:
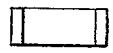

In carrying my invention into effect in one convenient manner as, for example, in its application to the production of a pole piece as used in a dynamo electric machine, I form the pole piece from a number of laminations or stampings *a* shaped to suit the finished shape of the pole piece and each of these I form or provide with two rectangular or other suitably shaped apertures *b* so that by means of such apertures the laminations may be threaded upon the correspondingly shaped limbs of a U-piece *c* of metal, the limbs of which are of such length that when the whole of the laminations are assembled thereon the ends of the limbs may be bent over, as shown in Figure 1, to prevent the laminations from coming apart.

Having now described my invention, what I claim as new and desire to secure by Letters Patent is:—

A pole piece for dynamo electric machines comprising a plurality of metal laminæ provided with apertures of polygonal shape, and a U-shaped clamping bar passing therethrough and each limb of the clamping bar being of polygonal cross-section corresponding to the shape of the apertures so as to preclude relative movement between the bar and the laminæ.

In testimony whereof I have signed my name to this specification.

ALBERT HENRY MIDGLEY.